United States Patent
Pialot

(10) Patent No.: US 7,261,785 B2
(45) Date of Patent: Aug. 28, 2007

(54) PROCESS AND MOLD FOR DEPOSITING A COLORED MOTIF ON A TIRE

(75) Inventor: Frédéric Pialot, Moissat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 201 days.

(21) Appl. No.: 10/671,488

(22) Filed: Sep. 29, 2003

(65) Prior Publication Data

US 2004/0060640 A1 Apr. 1, 2004

Related U.S. Application Data

(63) Continuation of application No. PCT/EP02/03613, filed on Apr. 2, 2002.

(30) Foreign Application Priority Data

Apr. 19, 2001 (FR) .................................... 01 05338

(51) Int. Cl.
*B29D 30/72* (2006.01)

(52) U.S. Cl. ...................... 156/116; 152/523; 152/524; 264/326; 264/502

(58) Field of Classification Search ................ 156/116, 156/123; 152/523, 524; 264/502, 326
See application file for complete search history.

(56) References Cited

U.S. PATENT DOCUMENTS

| | | | |
|---|---|---|---|
| 2,296,016 A | | 9/1942 | Bostwick |
| 2,985,216 A | * | 5/1961 | Williams et al. ............ 156/277 |
| 4,256,159 A | | 3/1981 | Williams |
| 5,296,077 A | * | 3/1994 | Bohm et al. ................ 156/395 |
| 5,653,840 A | | 8/1997 | Makonson et al. |

FOREIGN PATENT DOCUMENTS

| | | |
|---|---|---|
| DE | 30 46 572 A1 | 7/1982 |
| JP | 59055730 A | 3/1984 |

OTHER PUBLICATIONS

International Search Report dated Jun. 27, 2002.

* cited by examiner

*Primary Examiner*—Geoffrey L. Knable
(74) *Attorney, Agent, or Firm*—Buchanan Ingersoll & Rooney PC

(57) ABSTRACT

A process of depositing at least one uncured colored rubber mix forming a contrasting motif on an outer surface of a tire includes preparing a blank of the uncured tire to be moulded, including all the constituents except for the colored rubber mix(es), depositing the colored rubber(s) in at least one cavity formed on a removable insert, each cavity having the general form of the motif to be moulded and having a total volume V2, the total volume of non-vulcanized colored rubber V1 placed in each cavity being less than the volume V0, mounting the insert in a suitable housing provided on the moulding surface of the mould for the tire, engaging the tire blank within the mould, and moulding and vulcanizing the tire.

7 Claims, 2 Drawing Sheets

PROCESS AND MOLD FOR DEPOSITING A COLORED MOTIF ON A TIRE

This application is a continuation of International Application Ser. No. PCT/EP02/03613, filed Apr. 2, 2002, and which claims priority from French Application No. 01/05338 filed on Apr. 19, 2001, the entire content of which is incorporated by reference.

BACKGROUND OF THE INVENTION

The present invention relates to tires comprising colored markings, in particular characters or logos or other symbols, on their surface.

It is nowadays desirable to be able to embellish tires with colored markings, preferably with several different colors, and it is particularly desirable to obtain perfect sharpness of molding because these markings are used for mainly aesthetic reasons. In order to obtain such markings, several techniques are known to the person skilled in the art, and in particular U.S. Pat. No. 3,769,123 describes a process for depositing colored rubber mixes during building on a tire blank. The uncured tire blank is then introduced into a tire mold in order to be molded and vulcanized. This process does not provide sufficient accuracy as to the position of the colored motifs and requires, for example, covering these colored mixes with a thin layer of black rubber to effect the molding and the vulcanization of the tire in its mold before taking up this tire again in order to remove this black rubber locally by grinding in order to make the subjacent color(s) of the colored motif appear, while having lines of transition between the different colors [with] the desired sharpness.

In order to reduce the number of operations and to obtain, directly after molding the tire, a colored motif which contrasts with the color of this tire, U.S. Pat. No. 4,684,431 discloses a process using a mold comprising a housing within which is placed an insert having appropriate magnetic properties to hold a metal support covered on one of its faces by a colored appliquéof a non-vulcanized rubber mix. Then a tire blank is introduced into this mold in order to mold it, to vulcanize the mixes and to connect the colored appliquéto said tire. During the molding of the tire, the appliquéis integral with the tire with its support; then this metal support is removed by peeling.

In another process, described in U.S. Pat. No. 1,371,501, a mold is used which also comprises a housing intended to receive an insert in which there is formed a recessed motif which is filled with at least one non-vulcanized colored rubber mix such that, once the insert bearing the colored motif is in place in its housing, the continuity of the molding surface of the mold is produced both by the surface of the insert and by the surface of the colored motif before fitting in the tire blank.

Although they are of interest since the number of operations on the tire after curing is reduced, these latter two processes are not entirely satisfactory due to the fact that it has been noted that the limits of the colored motifs were not sufficiently sharp and precise and that an adverse change in the aesthetic appearance of the tire close to these motifs resulted. The Applicant has observed that this adverse change was amplified with the molding pressure used for molding the tire: in particular, the molding of a tire built on a rigid core results locally in very high pressures, which result in movements of the rubber mixes of different colors which become visible on the molded tire. It is thus very complicated to obtain colored markings forming a relief on the outer surface of the tire which have very sharp, precise contours.

SUMMARY OF THE INVENTION

The present invention proposes depositing one or more layer(s) of colored rubber mix on a tire which makes it possible to obtain a sharpness and precision of the colored motifs which is systematically good (that is to say, upon each molding of a tire) without having to take up the molded tires again. The process according to the invention makes it possible to control the movements of the mixes of different colors and to ensure that the zones of transition, between the color of the tire and the different colors of the motifs, are not located in regions adversely affecting the sharpness of the motifs.

According to the invention, the process of deposition of at least one uncured colored rubber mix forming a contrasting motif on the outer surface of a tire comprises the following steps:

preparing a blank of the uncured tire to be molded, comprising all the constituents except for the colored rubber mix(es), depositing the colored rubber(s) in at least one cavity formed on a removable insert, each cavity having the general form of the motif to be molded and having a total volume V0, the total volume of non-vulcanized colored rubber V1 placed in each cavity being less than the volume V0;

mounting of the insert in a suitable housing provided on the molding surface of the mold for the tire;

engaging the tire blank within the mold;

molding and vulcanizing the tire.

Preferably, the volume V1 of uncured rubber is less than 80% of the volume V0 of the cavity (this latter volume V0 corresponding substantially to the volume of the motif in relief which is molded on the surface of the tire).

It was noted that it was particularly advantageous industrially to combine the characteristic that the volume of the colored motif is less than the volume of the cavity with the characteristic that each cavity on a removable insert intended to be brought into a housing provided on the molding surface of the mold in order to facilitate the putting in place of the colored mixes to form a colored motif and to optimize the manufacturing time for the tires provided with colored motifs (the formation of a colored motif from the mold which is generally hot is complicated). This combination is particularly advantageous in the case of colored motifs with several colors.

In document DE 3046572, a process is described using a removable insert acting as a part-remover for forming a colored motif; this document neither describes nor suggests the characteristic that the volume of the cavity is greater than the volume of non-vulcanized mix deposited in said cavity.

The process according to the invention is advantageously applicable to obtaining colored motifs comprising several colors, the zones of transition between the different colors not being located in regions adversely affecting the sharpness of the motifs. To this end, the process according to the invention comprises the following steps:

preparing a blank of the uncured tire to be molded, comprising all the constituents except for the colored rubber mix(es), depositing a first colored rubber mix in part of a cavity formed on a removable insert and corresponding to the colored motif to be molded, this part of the cavity having a volume greater than the volume of said first non-vulcanized rubber mix placed in said cavity;

depositing at least a second rubber mix of a different color from the first colored mix in the complementary part of the cavity and on the first mix, the volume of this second rubber mix being such that the total of the volumes of all the colored mixes forming the colored motif is less than the total volume of the cavity corresponding to the volume of the motif;

mounting the insert in a suitable housing provided on the molding surface of the mold for the tire;

engaging the tire blank within the mold;

molding and vulcanizing the tire.

The example described with two mixes of different colors may easily be extended to the case of more than two mixes, each mix needing to occupy only part of the cavity and the total of the volumes of the different colored mixes needing to be less than the total volume of the cavity.

The markings produced by this process may be completely or partially in relief relative to the surface of the molded tire or alternatively may become apparent at the surface of the tire without being in relief. In all cases, it is advantageous for the walls limiting the colored motif during molding and vulcanization to protrude from the molding surface of the mold so as to mold around said motif a groove of greater or lesser fineness which also contributes to masking the molding irregularities and to giving a very good marking impression. These protruding parts may be part of the mold or of the insert itself.

The invention also relates to a tire mold intended for implementing the process of the invention. This mold comprises a shell for molding a sidewall, said shell having a housing opening on to the molding surface of the mold, and an insert to be mounted in the housing, the insert having a molding surface corresponding to the marking(s) to be molded. This insert comprises at least one cavity opening on to its molding surface, this cavity being calibrated suitably to form a reserve intended to absorb the dilations to which the mixes are subjected during vulcanization and molding of the tire and thus to promote the production of an aesthetically successful marking.

Preferably the tire mold according to the invention comprises means for holding the insert in place in its housing before introduction of a tire blank and during molding. In order to prevent the insert remaining on the tire during demolding, it is advantageous for the means for holding the insert to exert on said insert forces greater than the contact forces between the surface of the molded colored motif and the insert.

By means of the process according to the invention, a tire may be obtained which comprises on its outer surface a superposition of layers of colored rubber mixes forming a colored motif, the outermost layer relative to the tire having a smaller surface than the layer immediately adjacent towards the inside of the tire, and the innermost layer in the direction of the tire being present beneath the entire motif, the assembly consisting of tire and layers of colored mixes having been vulcanized at the same time.

BRIEF DESCRIPTION OF THE DRAWINGS

Other characteristics and advantages of the invention will become apparent from the description given hereafter with reference to the appended drawings, which show, by way of non-limitative examples, forms of embodiment of the subject of the invention.

DETAILED DESCRIPTION OF THE INVENTION

Figure 1:
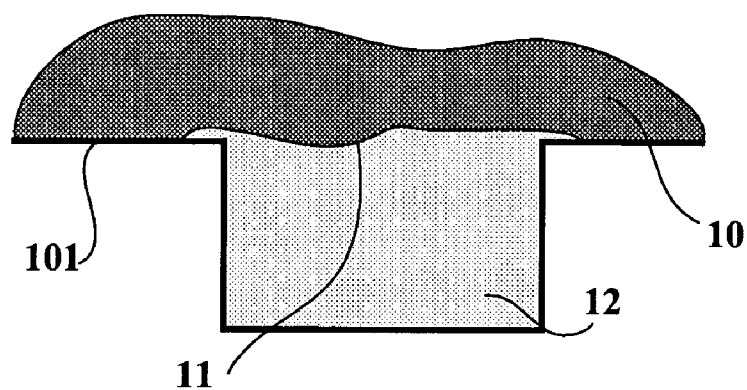
FIG. 1: partial view of a tire comprising a colored motif in relief obtained in accordance with a process of the prior art.

FIG. 1 shows a section through a contrasting colored marking 12 in relief on a tire 10 produced in accordance with a process of the prior art: it will be noted that very frequently the limit 11 between the motif and the tire appears on the surface 101 and is imprecise and irregular, which adversely affects the aesthetics and a good general appearance.

Figure 2:
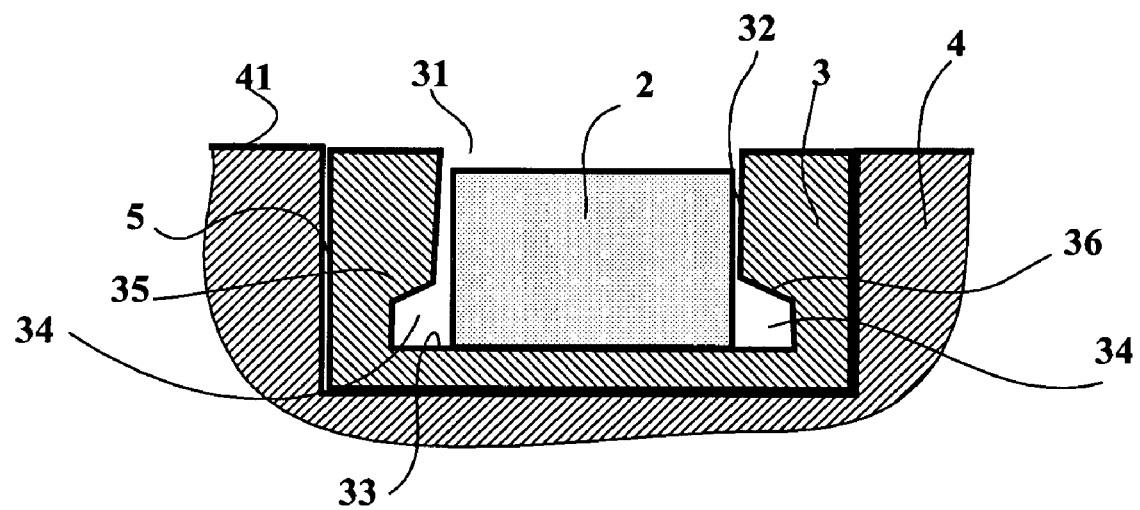
FIG. 2: a view of an insert in which is placed a colored mix, the insert being in place in a tire mold for implementing the process according to the invention in the case of a marking in relief.

FIG. 2 shows a partial section of a tire mold and more particularly of a mold shell 4 (that is to say a part having a molding surface 41 intended to mold the outer surface of a tire sidewall). This shell 4 comprises a housing or recess 5 opening on to the molding surface and within which there is placed an insert 3, the external contour of which is adapted to fit closely along the inner contour of the housing. Means for fastening the insert in its housing during the molding operation are provided but not shown here.

The insert 3 comprises a cavity 31 defined by lateral walls 32 and a bottom wall 33. The bottom wall is extended transversely into the lateral walls 32 to form two grooves 34. Drafts 35, 36 are formed on the lateral walls 32 to permit easier demolding after vulcanization of the rubber mixes.

Figure 3:
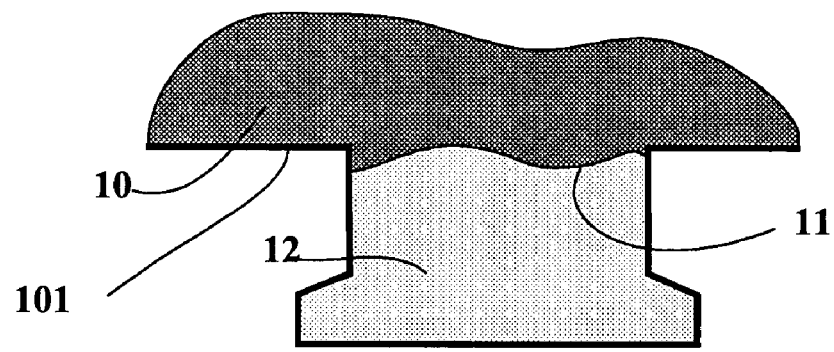
FIG. 3: a partial view of a tire comprising a marking in relief after molding in accordance with the process of the invention using the mold of FIG. 2.

Once the insert 3 has been removed from its housing 5, the cavity 31 is partially filled with a profiled element 2 of non-vulcanized colored rubber mix which is laid resting on the bottom of said cavity. Furthermore, a clearance is provided between this profiled element 2 and the walls 32 of the cavity such that the total volume of the profiled element is less than the total volume of said cavity. After filling the cavity of the insert, the latter is placed in the housing of the mold and made integral with said mold. The rest of the molding operations then consist of introducing a tire casing into the mold thus formed and then molding and vulcanizing the rubber mixes of which said tire casing is composed and those of which the colored motif forming a contrast with the color of the mixes of the tire casing is composed. The molding obtained with this insert is shown in section in FIG. 3; in this figure, it can be seen that the line 11 marking the boundary between the rubber mixes of different colors, forming on one hand the tire 10 and on the other hand the colored motif 12, no longer appears on the surface 101 of the tire on either side of the motif. Viewed from the outside, the colored motif 12 appears to have sharper contours than in the case illustrated in FIG. 1.

Figure 4:
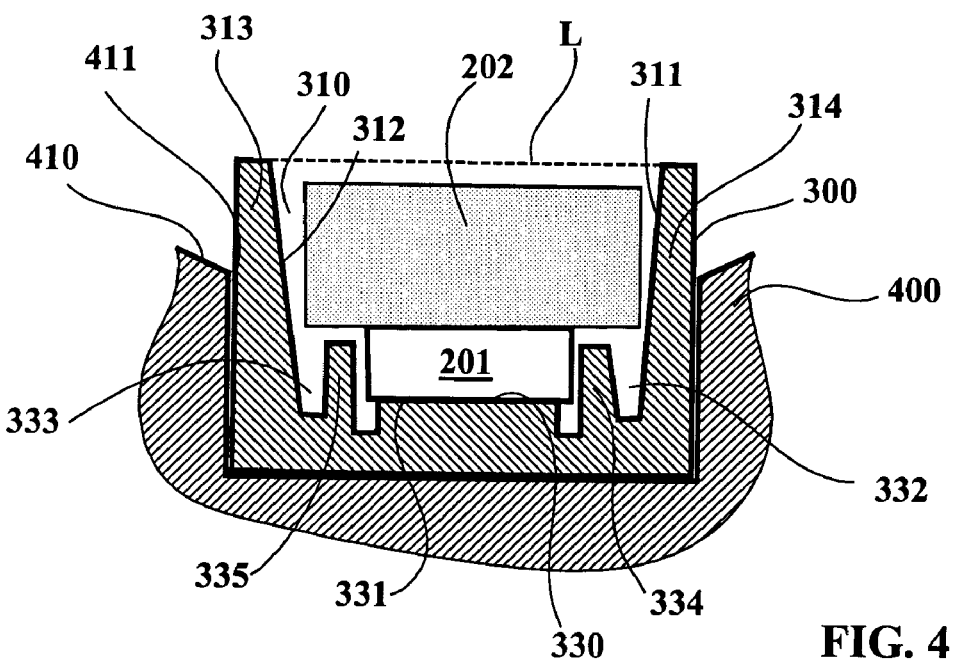
FIG. 4: a view in partial section of a tire mold according to the invention fitted with an insert comprising parts protruding from the molding surface and intended to deposit a motif composed of two distinct colors.

FIG. 4 shows a mold variant for molding a tire comprising a colored motif formed of two distinct colors. On the molding surface 410 of a mold 400 there is formed a housing 411 intended to receive an insert 300. This insert 300 comprises a cavity 310 defined by lateral walls 311 and 312 and a bottom 330; this cavity 310 has a total volume V0 (limited in the upper part of FIG. 4 by the broken line L). The insert 300 comprises extensions 313, 314 protruding from the molding surface 410 and intended for molding grooves in the tire (visible in FIG. 5) in order better to define the colored motif.

The bottom 330 of the cavity is divided into three parts: a central part 331 and two lateral parts 332, 333, the central part being separated form the lateral parts by ribs 334 and 335 protruding from the bottom and extending into the cavity 310. The ribs 334 and 335 define a subcavity 310a within the cavity 310.

In the process according to the invention, a layer of rubber mix 201 of a first color is arranged in the subcavity 310a of the cavity 310 of the insert 300, and on this first layer (called a previously-deposited layer) is arranged a second layer 202 (called a subsequently-deposited layer) of a second color different from the first. The volume of the first layer 201 is intended to be substantially les than the volume of the subcavity 310a defined by the ribs 334 and 335, wherein the parts 332, 333 of the cavity 310 are disposed laterally outwardly of the ribs. During vulcanization, rubber of the first layer 201 flows within the subcavity 310a, and rubber of the second layer flows laterally outwardly past the ribs and into the laterally outward parts 332, 333 of the cavity. The presence of the ribs makes it possible to obtain an excellent transition between the first and second colors of the motif after molding. The total of the volumes V! of the layers of different colors is less than the volume V0 of the cavity.

After this first operation of lining the insert with the colored mixes, said insert is placed in the housing provided on the mold and it is held in place with suitable means for molding and vulcanizing the tire and the colored mixes forming the motif.

Figure 5:
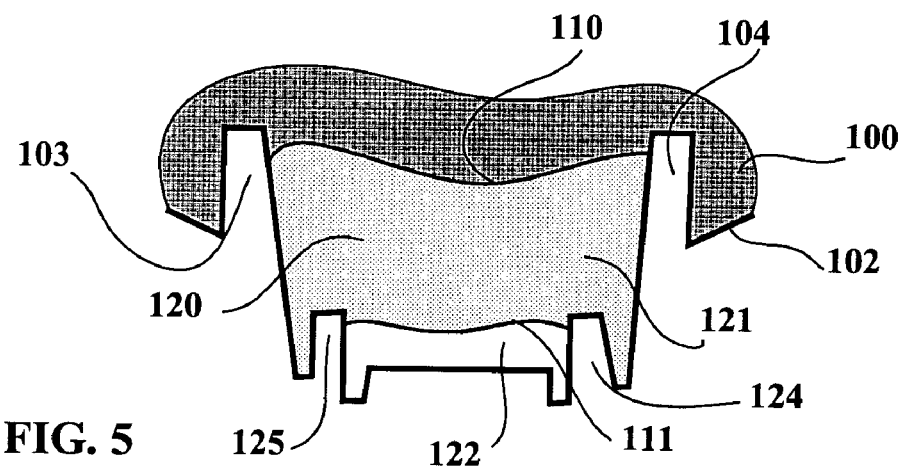
FIG. 5: a view in section of the marking obtained with the mold shown in FIG. 4.

The result obtained with the process of the invention can be seen in FIG. 5, which shows a partial section through the surface of a black tire 100 on which is molded a motif 120 having two different colors other than black that are visible to an observer of the motif. That is, the subsequently-deposited layer 120 projects beyond a periphery of the earlier-deposited layer 122 as can clearly be seen in FIGS. 4 and 5. Overall, the molded motif is very slightly in relief relative to the outer surface 102 of the tire; this motif is surrounded by grooves 103 and 104. A first limit 111 is visible on this section between the two layers of mixes of different colors 121 and 122 constituting the motif 120; the lateral ends of this limit 111 open into two grooves 124 and 125 molded by the ribs 334 and 335 present on the bottom of the cavity of the insert. A second limit 110 can be seen between the black mix forming the tire 100 and the mix 121 of the motif; this limit 110 opens into the grooves 103 and 104.

The fact that the ends of the limits between the mixes of different colors appear on the walls of the grooves on the molded tire makes it possible to improve very substantially the general aesthetic appearance of said tire.

The process of the invention which has been described makes it possible to obtain a tire comprising on its outer surface superposed layers of colored rubber mixes, the layer to the outside of the tire being of a smaller surface area than the layer immediately adjacent to the inside, the latter being present beneath the entire surface of the outermost layer, the assembly consisting of tire and layers of colored mixes having been vulcanized at the same time.

In the variant shown in FIG. 5, the points of the colored motif which are outermost relative to the tire are to the outside relative to the surface of said tire; it is of course possible to produce a motif which is completely set back relative to said surface.

To facilitate the demolding and in particular the demolding of the colored motif from the insert, it is advantageous to provide for the lateral walls of the cavity to have a draft angle of several degrees (preferably, at least 5 degrees in the case of mechanical machining of the cavity in the insert).

Advantageously, it is possible to cover all the colored mixes lining an insert before depositing the latter in its housing on the mold by a rubber mix having suitable characteristics in order for example to ensure better holding in place of the colored mixes or to avoid any subsequent migration of chemical elements from the mix constituting the tire towards the colored mixes of the motif which might adversely affect the appearance of said motif.

Figure 6:
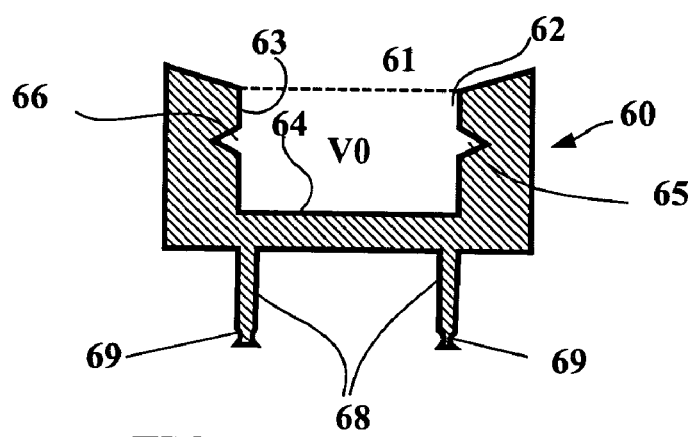
FIG. 6: a section through a variant of an insert comprising a means for fastening to the mold.

Finally, FIG. 6 shows in section a variant of an insert 60 comprising a cavity 61 of total volume V0 defined by lateral walls 62, 63 and a bottom 64. On the lateral walls 62 and 63 there are formed two grooves 65 and 66 intended to be filled by the colored mix during the molding operation.

The insert 60 is provided on its outer, front face intended to come into contact with the housing on the mold with protruding pins 68; these pins, which are of a length greater than the thickness of the mold at the level of the housing, are intended to be slipped into orifices formed on the mold to open on to the outside of the mold. There is furthermore provided a blocking device which can hold and release the end of said pin in order to immobilize the insert in its housing.

For example, the end of each extension comprises a part forming a constricted section 69 intended to cooperate with a locking part (not shown) formed for example in a blade provided with a notch of suitable dimensions for surrounding each constricted section and holding the insert in place in its housing for the molding and the various handling operations for the mold before and after molding.

Furthermore, means may be provided for ejecting the pins to permit extraction of the insert after molding of a tire.

Another advantageous variant for connecting an insert in a housing in a tire mold consists of producing said insert from a magnetic material and providing said mold with at least one permanent magnet having the property of withstanding temperatures at least equal to the vulcanization temperature of the tires and an appropriate number of vulcanization cycles. It is advantageous to provide for the magnetic force for holding the insert in place to be greater than the adhesive force which may exist between the surface of the rubber mixes constituting the colored motif such that during demolding the insert remains in place in its housing and does not follow the tire. After demolding the tire, a gripping means is used which is capable of exerting on the insert a force greater than the magnetic force exerted by the mold on the insert (advantageously, this latter gripping means is capable of exerting a magnetic force).

The invention is not limited to the examples described, and combinations of the different variants presented may easily be produced by a person skilled in the art without departing from the scope of this invention.

What is claimed is:

1. A process of forming, on an outer surface of a tire, a color-contrasting motif comprised of at least one uncured colored rubber mix, the process comprising the following steps:
   a) preparing an uncured blank of a tire to be molded;
   b) depositing uncured colored rubber in a cavity formed in at least one insert, the cavity including a subcavity delimited by a rib arrangement disposed in the cavity, wherein parts of the cavity are disposed laterally outwardly of the rib arrangement, the colored rubber being color-contrasting with respect to the blank, the cavity having the general form of the color-contrasting motif to be molded and having a total volume ($V0$), the total volume of uncured colored rubber ($V1$) deposited in the cavity being less than the volume ($V0$), wherein the uncured colored rubber comprises a plurality of layers of rubber of different respective colors, the layers being deposited successively one upon the other during step b such that a subsequently-deposited layer is disposed on a previously-deposited layer; thereafter
   c) mounting the at least one insert in a recess provided in a molding surface of a mold for the tire;
   d) engaging the blank within the mold;
   e) vulcanizing the uncured blank and the uncured colored rubber, wherein rubber of the previously-deposited layer flows within the subcavity, and rubber of the subsequently-deposited layer flows laterally outwardly past the rib arrangement and into the laterally outward parts of the cavity, as the vulcanized colored rubber forms a multi-colored motif; and
   f) removing the at least one insert from the motif to reveal the multiple colors which are visible to an observer of the motif.

2. The process according to claim 1 wherein the volume ($V0$) of the cavity is such that the volume of uncured colored rubber ($V1$) is less than 80% of the total volume ($V0$).

3. The process according to claim 1 wherein the cavity comprises, on at least one wall thereof, at least one recess which is left empty of uncured colored rubber following step b.

4. The process according to claim 1 wherein following step c, a portion of the insert protrudes from the molding surface so as to mold, in the tire, at least one groove bordering the motif.

5. The process according to claim 1 wherein the at least one insert comprises a plurality of inserts, and step c comprises mounting the inserts in respective recesses of the molding surface such that multiple motifs are formed in the same sidewall of the tire.

6. The process according to claim 1 wherein the previously deposited layer is of a volume less than a volume of the subcavity.

7. A process according to claim 1 wherein step b comprises depositing the subsequently-deposited layer such that it projects laterally outwardly beyond the subcavity.

* * * * *